Nov. 20, 1945.   E. S. PEARSALL, JR., ET AL   2,389,274
AIRCRAFT CONTROL SYSTEM
Filed Feb. 4, 1941   2 Sheets-Sheet 1
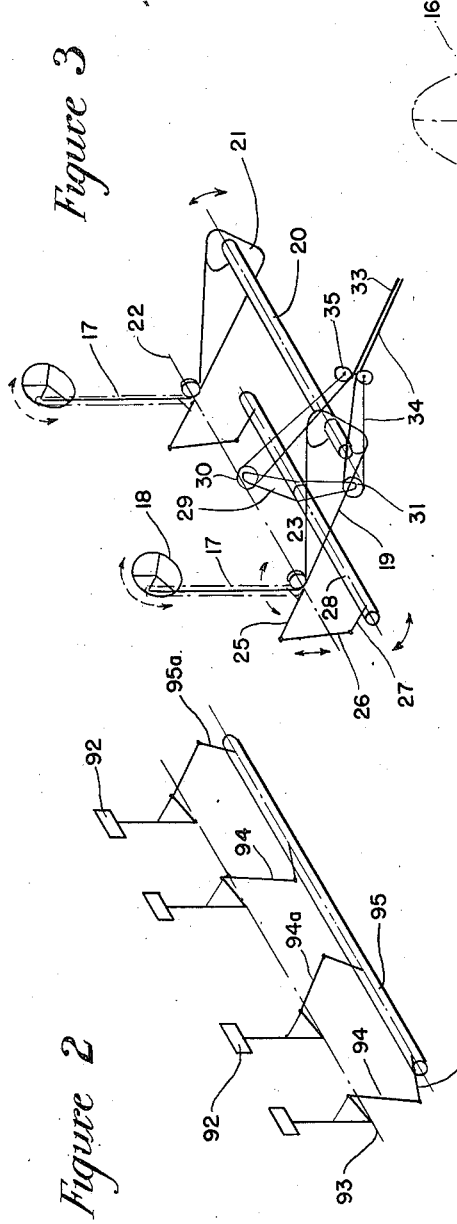
Robert Richolt INVENTORS
and Earle S. Pearsall, Jr.
BY James M. Clark
Their Patent Attorney

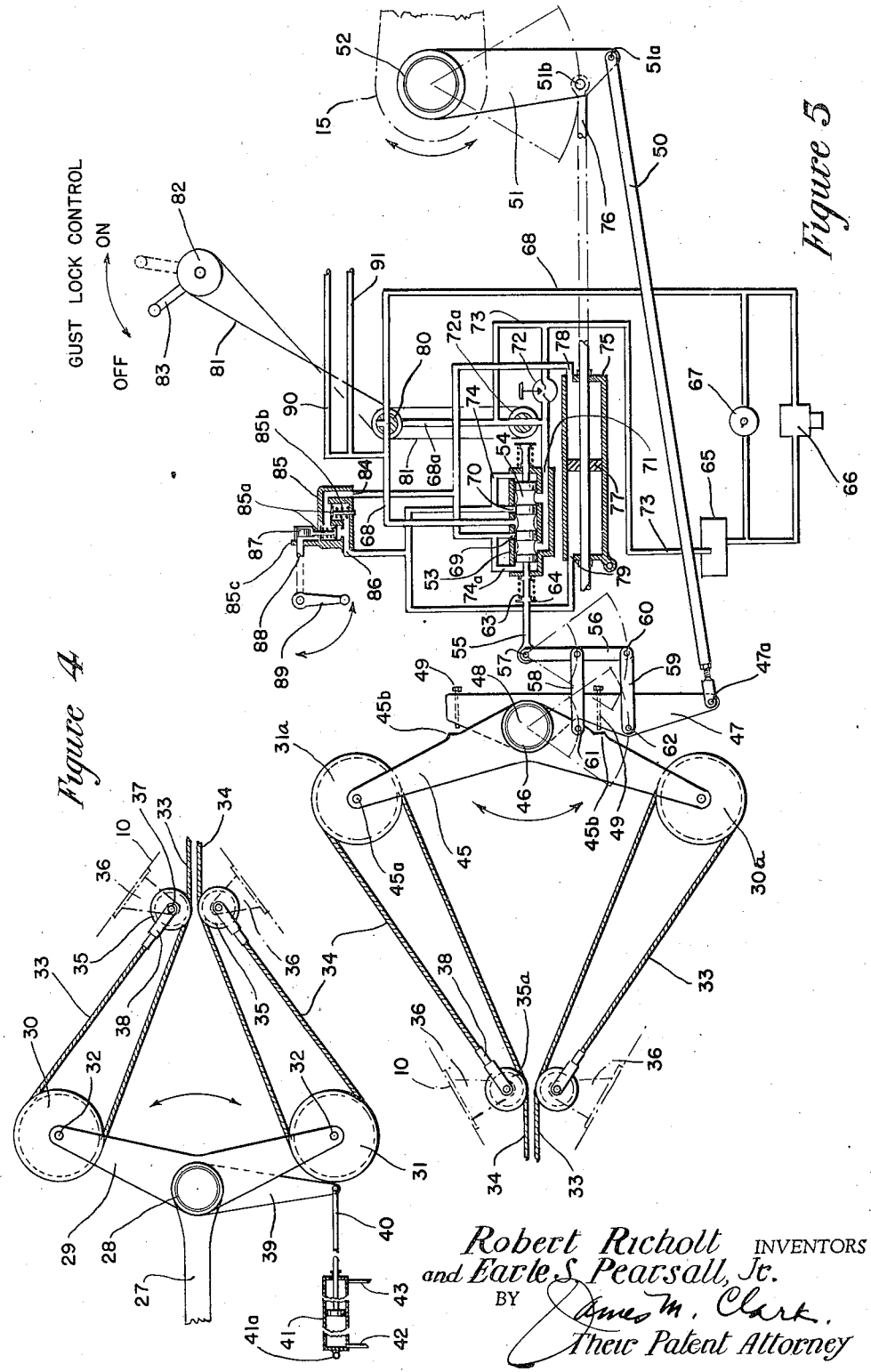

Patented Nov. 20, 1945

2,389,274

UNITED STATES PATENT OFFICE 2,389,274

AIRCRAFT CONTROL SYSTEM

Earle S. Pearsall, Jr., Hollywood, and Robert Richolt, Tujunga, Calif., assignors to Lockheed Aircraft Corporation, a corporation of California Application February 4, 1941, Serial No. 377,290

14 Claims. (Cl. 121—41)

The present invention relates to control systems for aircraft and more particularly to a hydraulic booster control for relatively large airplanes.

In aircraft in which the control surfaces present large areas to the airstream, and in medium size aircraft which fly at high speeds, the control forces required to be exerted by the pilot reach magnitudes which have to be assisted by boosters, servo motors or other means which provide auxiliary assisting forces. Otherwise their operation becomes very strenuous and tiring to the pilot and in large aircraft he would not have sufficient strength to overcome these loads and control the aircraft in flight. In providing such booster control systems it is desirable to provide such necessary features as a system which permits of a direct connection to the control surface in the event of failure of the booster system; the provision of the necessary degree of "feel" of the controls comparable to the sensing of the controls of prior mechanical systems as used on smaller aircraft; and it is usually also desirable that the booster system be such that the automatic pilot control may be employed in the usual manner to take over the controls from the manual pilot and when so doing to actuate the control surfaces through the booster system. In such case the automatic pilot needs only exert the usual moderate forces upon the controls which manual piloting would require with the booster system.

The present invention is directed toward improvements in such hydraulic booster control systems and overcomes a number of the objections and difficulties experienced in prior devices. It comprises essentially a relatively light and novel cable arrangement for transmitting the moderate pilot control forces to the hydraulic booster which may be located immediately adjacent the surface to be controlled. A major feature of the present arrangement resides in the provision of a reactive coupling means interconnecting drive and driven elements in such a manner that a virtual reflection or "load feel" is obtained by the pilot as distinguished from the absence of "feel" of prior hydraulic booster systems in which the position of the control surface could be sensed only by the degree of displacement or movement of the control column, or by means of the action of resisting springs or the like means which gives a false "feel" through the controls. The present booster arrangement also provides for automatic change-over of manual control on failure of the hydraulic system as well as provision for superimposing the conventional automatic pilot control upon the manual-booster system. The invention also comprehends the use of a controllable booster by-pass, both manually and automatically operable, to prevent overloading of the control surfaces and also a hydraulic lock and snubber adjustment for metering the rate of oscillation of the surfaces when the aircraft is parked upon the ground.

It is accordingly an object of the present invention to provide a pilot control which transforms small pilot forces into relatively greater hydraulic forces for readily moving large surfaces. It is also an object to provide a power control system which is simple and economical in character and readily adapted to use with the conventional type control columns and rudder pedals, and on which the conventional automatic pilot control can be readily superimposed. A major object of the present invention is to provide a hydraulic control means whereby the amount of boost and the "feel" of the pilot control element is readily regulated.

A further object contemplates the provision of a metering or speed control means to regulate the snubbing action by controlling the rate of flow and thereby the rate of oscillation of the surfaces when the aircraft is parked. Another object lies in the provision of a booster by-pass, both manually and automatically operable, which serves as a relief means to prevent overloading of the control surfaces in flight. A further object contemplates utilizing a hydraulic servo motor control having an associated reactive coupling or "free play" arrangement through which the pilot control forces are transmitted to the hydraulic booster with the desired amount of "feel" reflected in the controls, and an automatic arrangement operable upon failure of the hydraulic system to directly control the surfaces. The invention also contemplates the material saving in weight by the provision of a novel cable system between the pilot controls and the booster-servo mechanism which is located adjacent the respective control surface.

Other objects and advantages of the present invention will become apparent to those skilled in the art after a reading of the following specification and the accompanying drawings, forming a part hereof, in which;

Figure 1 is a diagrammatic outline of an airplane showing the present invention applied to the elevator control;

Figure 2 is a similar perspective view of the rudder pedal controls;

Figure 3 is a similar perspective view of the control columns for the pilot control of the ailerons and elevators;

Figure 4 is a detail view of a forward portion of the elevator control system shown in Figures 1 and 3;

Figure 5 is a diagrammatic outline of the hydraulic booster and associated servo-control mechanism for operation of the elevators; and Figure 6 is an enlarged cross-sectional view of the piston control valve indicated in Figures 1 and 5.

Referring now to Figure 1, the airplane 10 is provided with a conventional wing 11 and the pilot control compartment 12 which is provided with laterally disposed pilot seats 13. The airplane 10 is provided with conventional ailerons 14 associated with the wings 11 for obtaining lateral control, and conventional elevators 15 and rudders 16 for the usual vertical and steering controls, respectively. Within the pilot cockpit 12 there is provided dual control columns 17, one for each pilot, these columns being identical in construction and arranged such that movements of one result in like movements of the other. Each control column 17 is provided at its upper extremity with a control wheel 18 for aileron adjustment. Rocking of the control column 17 in a fore and aft direction in the usual manner about the axis 22 causes corresponding rotation of the elevator torque tube 28 due to the interconnected links 25, 26 and 27. A control horn 29 is fixedly attached to the torque tube 28 and is provided with sheaves 30 and 31 pivoted to the extremities of the arms at 32 as more clearly shown in Figure 4.

Similarly, when the control wheels 18 are rotated about their longitudinal axes corresponding rotation is imparted to the aileron torque tube 20 through the cables 19 which are anchored to the torque tube quadrants 21 and are guided by the fairlead sheaves 23 at the bases of the control columns. Cables to the aileron in the wings extend from bellcranks (same as 29) mounted on the torque tube 20 and make connection to the aileron boosters by means of the cables 24. For purposes of explaining the present invention the control system for the elevators only will be described, it being understood that the aileron and rudder control surfaces are operated similarly by means of separate hydraulic boosters and servo-cylinders, preferably having different ratios of boost, located close to the respective surfaces.

Fore and aft movements of the control columns 17, as referred to above, are transmitted from the elevator torque tube 28 to the booster control shaft 46 through two runs of cable 33 and 34. As may be seen in Figures 4 and 5 the cable 33 is anchored at its forward terminal to the pivot 37 of the sheave 35, the cable being provided with a suitably apertured terminal fitting 38. The sheave 35 is rotatably mounted in the cable bracket 36 which is suitably anchored to the aircraft structure 10. The cable 33 extends forwardly having a bight or loop around the sheave 30, and in returning rearwardly is guided by the aforesaid terminal sheave 35 which is free to rotate as a result of relative movement of the cable by rotation of the sheave 30 in its arcuate path about the axis of the elevator torque tube 28. The rear terminal of the cable 33 is similarly anchored at the rear terminal sheave 35 similarly supported by the bracket 36 to the aircraft structure 10.

In order to obtain the desired rotation of the elevator surfaces the upper and lower cables 33 and 34 are crossed in a vertical sense, without touching, intermediate their guide and terminal sheaves 35 and 35a such that cable 34 is run to the upper sheave 31a on the control arm 45 and cable 34 runs over the sheave 30a which is pivotally mounted on the lower arm of the control horn or primary lever 45. The cable run 33—34 as shown in Figure 1 is suitably guided between the forward and aft portions of the fuselage by means of the guide sheaves 44 which are arranged such that each of the cables, which are preferably of the same length, are caused to move along paths which are also identical in length. It will be noted that these cables are arranged such that they are self-adjusting with respect to their lengths in the various rotative positions of the control systems 29 and provide a cable transmission system which maintains the desired tension in each cable run and permits of a balanced and equalized system.

The present control system is adapted for use with conventional automatic-, or gyro-pilot control preferably by the provision of additional levers carried by the torque tubes of the several controls. Referring to Figure 4 for the elevator control, a lever arm 39 is fixedly attached to the torque tube 28 and is pivotally connected to the piston rod 40 of the gyro servo-cylinder 41 of the automatic pilot which obtains its hydraulic fluid for operation of the control through the flexible conduits 42 and 43. The gyro servo-cylinder 41 is preferably pivotally mounted at its forward end by the pivot 41a upon the aircraft structure to permit the cylinder to follow the path of the lever 39 and to avoid the necessity of providing a pivotal joint within the length of the piston rod 40.

When the pilot forces are applied directly to the elevator 15 without the benefit of the hydraulic booster, controlling movements of the control column 17 are transmitted to the torque tube 28 by the above mentioned linkage 25, 26 and 27 and from this torque tube to the control arm torque tube 46 by means of the equalized cables 33 and 34. The control arms or primary drive cranks 45 are rigidly attached to the shaft 46, which is journalled upon the aircraft structure and on this shaft there is also freely mounted the free or secondary arm or driven crank 47 rotating on the axis 48. Raised shoulders 45$^b$ are provided on the drive arms 45 and are in turn oppositely disposed from the adjustment screws 49 on the free lever 47. This permits the free or driven crank 47 to rotate within relatively close limits, at variance with the drive crank as determined by the positions of the limit stops 49, or the condition of the booster control. For direct manual control of the elevator when the hydraulic booster is disconnected, rotation of the drive arms 45 beyond the clearance limits between the shoulders 45$^b$ and the adjustable screws 49 causes corresponding rotation of the free arm 47. The latter is pivotally connected at 47a to the push-pull rod 50, which in turn is pivotally connected to the elevator control horn 51 at the pivot 51a resulting in desired rotation of the elevator 15 about its shaft 52.

The hydraulic booster control for the elevator as shown in Figures 5 and 6 consists essentially of a balanced four-way valve 53 by means of which the fluid pressure developed by the pump 66 is selectively directed to the ends of the servo-motor cylinder 75. The valve cylinder 53 is provided with a multiple piston 54 fixedly mounted upon the piston rod 55 which is arranged for reciprocating motion through the ends of the valve cylinder 53. The piston 54 is capable of a relatively small valve travel in each direction from its neutral or central position (a satisfactory valve travel in each direction having been found to be approximately three-sixteenths of an inch, although this may be varied to suit particular conditions).

To the end of the piston rod 55 a free link 56 is pivotally connected at 57 and two parallel links 58 and 59 are also pivotally connected as by the pivot 60 to the free link 56. The parallel link 58, however, is pivoted at its other extremity to the pivot 61 of the drive crank 45, and the other terminal of the second parallel link 59 is pivotally connected to the free arm 47 by the pivot 62. The piston rod 55 is provided with flanged or shouldered portions 64 at points which are preferably equally spaced from each end of the valve cylinder 53, and springs 63 are interposed between these flanges and the adjacent cylinder ends, the springs serving to centralize the piston 54 within the cylinder 53 and also to damp out and absorb any shocks to which the system might be subjected.

With the pivot point 57 at its midpoint of rectilinear travel, or in other words, with the balanced valve 53 in its neutral position the pivot point 48 of the torque tube 46 is spaced a like distance from pivot 57 as are also the pivots at the ends of the links 58 and 59. This serves to form a parallelogram linkage arrangement in which the links 58 and 59 are parallel and the link 56 serves as a beam fulcrumed at its midpoint upon the link 58 subject to the pilot's control and having the control surface load applied through the link 59 at one of its terminals and the setting of the balanced valve associated with its opposite terminal by means of the pivotal connection 57 to the valve piston 55. The space between the pivots 61 and 62 on the independently movable arms 45 and 47 serves as a variable length side of the quadrilateral formed by these four pivot points.

The hydraulic booster system utilizes a suitable fluid, preferably oil, which is stored in the tank or receiver 65 and is circulated under high pressure by the power-driven pump 66. Between the tank outlet, or the suction side of the pump 66 and the pipe 68 forming the pump discharge, there is connected a pressure regulator 67 which may be of any known type suitably adjustable to maintain a predetermined pressure in the system and which permits the bleeding back or return of fluid when the pressure exceeds the predetermined amount. The pressure supply line 68 passes through a centrally disposed port in the valve casing 53 between the two central portions of the piston 54 which normally close the exit ports 69 and 70 in the neutral or balanced position of the valve. Dual exit ports 71 are provided near the aforementioned piston end portions and the ends of the cylinder 53, the exit pipe 71 being open to the return line 73 to the sump or receiver 65.

The valve exit or fluid return line 73 is interconnected with the fluid pressure line 68 by a pipe 68a and the three-way valve 80, this interconnecting line being normally closed by the valve 80 when the hydraulic booster system is in use. The snubber valve 72 which is normally by-passed by valve 72a when the hydraulic booster system is in use provides a controllable orifice for regulating or metering the rate of fluid flow through the interconnecting pipe between the exit pipe 71 and the fluid return line 73 when the booster system is not in use. This is particularly advantageous in controlling the rate of oscillation of the elevator or other control surface when the aircraft is parked upon the ground. When the booster system is operating, valves 80 and 72a, which are coupled together by suitable means for simultaneous operation, are in the positions shown. When the booster system is inoperative and the gust lock is to be operative, interconnected valves 80 and 72a are simultaneously rotated 90° in a counter-clockwise direction to a position such that the portion of the normal pressure line 68 nearest the valve 53 is connected through the bypass 68a to the return line 73; accordingly with the bypass valve 72a in its closed position, fluid flow induced within the system by gust blows on the surface 15, and the resulting movement of the servo-piston, will be caused to pass through the control valve 53, as well as through the snubber valve 72.

The hydraulic system includes a servo-cylinder 75 comprising a piston rod 76 which is pivoted at 51b to the elevator horn 51 and is provided within the cylinder with a piston 77 fixedly mounted upon the rod 76. The cylinder 75 is preferably pivotally mounted (similar to the gyro-cylinder 41, Figure 4) to avoid a joint in the piston rod 50 and the pressure lines connecting ports 78 and 79 with the fixed cylinder 53 are preferably rigid (with swivel joints). The ends of the servo-cylinder 75 are provided with ports 78 and 79 which are connected by suitable piping with the ports 69 and 70, respectively, of the balnced valve 53. It will be noted that the forward port 79 in the servo-cylinder is connected to the rear port of the balanced valve, and the rear port 78 of the servo-cylinder is connected to the forwardly located port 69 in the balanced valve. Accordingly forward movement of the piston 54, permitting fluid under pressure to flow from the central pipe 68 out through the port 69, thence through the port 78 into the rear space of the cylinder 75 causes the piston 77 to move forwardly in the same direction as the piston 54. Similarly, rearward movement of the piston 54, resulting in partial uncovering of the port 70 results in fluid under pressure flowing from the pipe 68 out through the port 70 into the forward pipe of the servo-cylinder 75 through the port 79 resulting in like, or rearward movement of the piston 77 and the attached piston rod 76 and upward rotation of the surface 15.

The booster by-pass valve assembly 85 is connected across the two pressure lines 69 and 70 between the balanced valve 53 and the cylinder 75 which have just been described. A branch pipe connects the pressure line between the ports 70 and 79 to a port 86 of the booster by-pass 85, and a similar branch pipe opening into port 84 connects the pressure line which runs from port 69 of the balanced valve to port 78 on the servo-cylinder. The booster by-pass 85 contains two oppositely working poppet or relief valves 85a, each of which are normally held in their closed positions by the springs 85b. The casing of the by-pass unit has an upstanding portion 85c which serves as a bearing for the forwardly extending shaft 88 on which is fixedly mounted a cam face 87 in rotating contact with the stem of one of the valves 85a.

When desired the by-pass valve assembly may be used as a de-booster to cut out the hydraulic boost altogether. By rotating the handle 89 the pilot may impart similar rotation to the cam 87 causing the adjacent poppet valve 85a to be opened against the pressure of its spring 85b permitting fluid under pressure to be by-passed from one end of the servo-cylinder 75 to the other thereby serving to hydraulically disengage the action of the booster system upon the control surface 15. The handle 89 is preferably located where it can be conveniently operated by the pilot or a member of the crew, as is also the handle 83 by means of which the above-mentioned three-way valve 80 is controlled through the flexible means 81, the shaft or sprocket 82 and a smaller sheave carried upon the valve.

In the position shown in Figure 5 the valve 80 permits the fluid pressure developed by the pump 66 to pass into the central portion of the four-way valve 53 for booster operation of the control surface. In this same position it cuts off flow from the return port 71 of the valve 53 and causes the return to flow entirely into the line 73 and the sump 65. The valve 80 when in the position shown also permits fluid pressure to pass through the lines 90 and 91 to the booster control systems for the ailerons and the rudder which operate similarly to the booster system being described for the elevators. By rocking the rudder pedals 92 about the axis 93 the rudder torque tube 95 is rocked in the desired direction by means of the links 94 and 94a and the levers 95a and 95b, actuating a similar cable and booster mechanism as described above for the elevator control. Accordingly, it is not considered necessary to describe the aileron and rudder controls separately.

In operating the elevator control with the assistance of the hydraulic booster the pilot rocks the control column 17 either in a forward or rearward direction about its axis 22 the same as he normally would if the elevators were manually controlled. Forward movement of the column 17 results in counter-clockwise rotation of the elevator torque tube 28 by virtue of the interconnected linkage 25, 26 and 27. Similar counter-clockwise rotation of the control arm 29 and concurrent movement of the pivotally attached sheaves 30 and 31 causes forward movement of the main run of the cable 33 and paying out or slackening of the cable 34. Since the forward terminal of the cable 33 is anchored by the fitting 38 to the pivot 37 on the bracket 36, counter-clockwise movement of the sheave 30 about the torque tube 28 causes tensioning or tightening of the cable 33, and both sheaves 30 and 35 will rotate in a clockwise direction as the main run of the cable 33 moves forwardly under and around these sheaves to be carried into the space between the sheaves.

Inasmuch as the upper cable 33 becomes the lower cable as it extends rearwardly to pass over the sheave 30 which is now on the lower arm of the control lever 45 the latter is caused to rotate in a clockwise direction about its shaft 46. The cable and sheave arrangement is such that no slack or play occurs in the cable which is not directly tensioned by the movement of the control column but that the pilot force is transmitted through the tensioned cable 33 and across the double control arm 45 and into the cable 34 which is drawn rearwardly, concurrent with the forward movement of 33 and assisting the latter by exerting a counter-clockwise rotative force on the lower arm of the bellcrank or double lever 29.

As the driven crank or control lever 45 is rotated in a clockwise direction about its shaft 46 the link 58 is drawn to the left or forwardly due to its pivotal connection with the arm 45 at the pivot 61. This transmits similar forward movement of the free link 56 through its pivotal connection with the link 58. It will be understood that these movements all occur during the initial part of the movement of the control column and the associated mechanism and before the shouldered portions 45b of the arms 45 can come into contact with the adjustment screws 49 on the free arm 47. As the link 56 is drawn to the left at its intermediate pivotal connection it tends to push the link 59 to the left tending to cause the free arm 47 to rotate in a counter-clockwise direction due to the pivotal connection 62. The initial small movement of the arm 45 serves to draw the piston rod 55 of the balanced valve 53 in a forward direction. Partly due to the air forces to which the elevator 15 is subjected when rotated slightly about its pivot 52 and to its inertia and that of its associated mechanism, the forward movement of the pivoted end 60 of the link 56 will be opposed and the resulting effect or "feel" will be transmitted to the pilot through the control column 17.

Inasmuch as the movement or travel of the balanced valve 53 is in the order of about three-sixteenths of an inch total in each direction, any slight forward translational movement of the piston 54 will initially cause start of movement of the surface due to displacement of fluid through the pipe 74a through the port 78. Further movement permits fluid pressure to bleed from the central portion open to the pipe 68 and out through the port 69. This fluid under pressure then passes through the port 78 of the servo-cylinder 75, rearwardly of the piston 77, imparting a forward movement to the piston rod 76 and causing the elevator 15 to be rotated downwardly, or in a clockwise direction, about its pivot 52 through the pivotal connection 51b with the control arm 51. As the piston 54 has been moved forwardly and fluid under pressure is permitted to flow through the port 69 the opposite side of the port 70 becomes uncovered permitting the fluid which is expelled from the forward portion of the servo-cylinder 75 by its piston 77 to pass through the port 71, the open valve 72a around the snubber valve 72, through the pipe 73 and into the reservoir 65. Continued application of pilot force imparting forward movement of the control column 17, maintains the piston 54 of the balanced valve 53 in its forward position causing further rotation of the control surface 15, at the same time maintaining the angularly spaced relationship between the drive arm 45 and the free arm 47.

As long as the pilot exerts the moderate force necessary to move the column 17 and keep the valve piston 54 out of its neutral position the surface 15 will continue to be moved. If movement of the column 17 now be stopped the load exerted on the undersurface of the elevator 15 tends to return the piston 54 to its opposite extreme position, but by continuing to exert a relatively small forward pressure upon the control column, the pilot can arrest the rearward movement of piston 54, holding it at its neutral position, at which the surface 15 will be maintained at its downwardly adjusted position. In all of these conditions it will be noted that the pilot has positive "load feel" instead of merely an estimate of the feel due to the degree of displacement.

At the time that the forward movement of the control column 17 has reached its forward limit for any given control movement and the corresponding clockwise rotation of the control arm 45 has been stopped, the springs 63 then assist the fluid pressure acting on the forward end of the piston valve 54 in urging the same to be returned to its central position in which position the valve ports 69 and 70 are again closed by the portions of the piston 54. The hydraulic fluid which is thereby trapped within the forward and rear portions of the servo-cylinder 75 serves to maintain the piston 77 and thereby the control surface 15 in the adjusted position.

If it now be assumed that the surface 15 has been rotated to an extreme position at which it is subjected to excessive upward forces, due to certain flight conditions, it will cause a pressure to be created within the conduit extending between the servo-cylinder port 78 and the port 84 of the booster by-pass valve 85 such that the corresponding poppet valve 85a will be depressed against its spring 85b, and the excess pressure permitted to be by-passed through the port 86 and into the port 79 on the other side of the piston 77 until the pressure has been relieved or reduced to the extent that the poppet valve 83 is again forced closed by its spring 85b. The control surface 15 is restored to its neutral or normal position by opposite movement of the column 17 imparting counter-clockwise rotation to the arm 45 at its shaft 46 permitting the surface 15 to be rotated in a like direction both by the air forces exerted upon it and the hydraulic effect resulting from slight rearward movement of the piston 54.

The pilot's sense of actual "feel" of the load upon the control surface is obtained from the diminished but proportional forces actually reflected back through the control system from the control surfaces. These reflected forces are applied to the control system through the piston 54, rod 55, linkage 56, 58 and lever arm 45, and results from the differential fluid pressure transmitted to the outer opposite ends of the piston 54 in the cylinder 53 through the branch pressure lines 74 and 74a leading from the opposite ports 79 and 78 respectively of the servo-cylinder 75. The diameter of the small pistons at each end of the four-way valve 53 may be made to have any desired ratio to the diameter of the servo-piston 77. The ratio of diameters should be such that with a given load on the servo-cylinder a suitable constant percentage of that load will be reflected back through the control systems to the pilot who is pushing on the end of the four-way valve and thereby obtains a reaction or "feel" which is in direct proportion to the load on the servo-cylinder. These connections to the small pistons at the ends of the valve 53 also serve to prevent end play or lost motion in the operation of the valve. This is accomplished by the action of the end pistons in immediately forcing oil out from one or the other of these small end cylinder spaces into the corresponding servo-cylinder space at the instant of any initial movement of the piston 54, thus causing an immediate start of movement of the surface through a direct manual load before the hydraulic power system comes into operation.

When the aircraft is grounded and it is desired to bring the effects of the gust lock feature into the above described system, the handle 83 is rotated into its dotted or "on" position as shown in Figure 5, thereby rotating valves 80 and 72a, 90° in a counter-clockwise direction. These positions of the gust lock three-way valve 80 and valve 72a opens the piston valve side of the fluid pressure line 68 through to the branch line leading from port 71 in which the throttle or snubber valve 72 is located, thus allowing a restricted by-pass of the fluid pressure around the four-way valve 53 and directly into the line 68a and into the return line 73 leading to the receiver 65. The valve 72 is of the needle type and provides a fine metering adjustment for bleeding the fluid under pressure back into the return line. In allowing this oil to flow through it, the flow may be regulated by the snubber valve 72 in such a manner that the rate of oscillation of the surfaces 15 is controlled in the desired degree when the airplane is parked on the ground. Under these conditions the springs 63 at each end of the balanced valve 54 tend to maintain the piston in its neutral or central position and any gust load on the surface 15 causes pressure inside either of the small "feel" chambers connected to the pipes 74 and 74a at the ends of the four-way valve 53. When this pressure, as for example that resulting from an upward gust on the surface 15, becomes sufficiently high to overcome the pressure of the spring 63 at the left end of the piston of the four-way valve, the valve will open as a result of its piston moving to the right and allow the oil to be transferred from the right side of the servo-cylinder through 78, port 69, through the four-way valve and out through 71. It then passes through the snubber valve 72 and pipes 73 and 68a, the gust lock valve 80, back through 68 and into 70 at the four-way valve 53 thence to the other side of the servo-cylinder through port 79, thus allowing the surface to rotate slightly but at the same time snubbing it against sudden blows, through the action of the valve 72 restricting the fluid flow.

While the airplane is parked upon the ground the gust lock feature is utilized by throwing the hand lever 83 into the "on" position, thereby rotating valves 72a and 80 a quarter turn in the counterclockwise direction. The pilot control column 17, when released of the pilot's grip, is preferably left unlocked and the control column as well as the attached control system, up to and including the cross-arm 46, are free to move. Accordingly, as gusts may be imposed upon the control surface 15 causing concurrent movement of the push-pull rods 50 and 76, no forces which are so developed can be imposed upon the valve stem 55 through the linkage 56, 58, 59 inasmuch as each of the pivots of this parallelogram linkage is free to move concurrently along their separate arcuate plans. The valve stem 55 is held in its centered position by the springs 63 and when sufficient pressure is generated in the boost cylinder to create pressure, for example, in the line 74a, it shifts the valve 54 to the right, as would result from an upwardly directed gust on the surface 15, corresponding to the condition of counterclockwise motion of the control arm 51. The pressure flow is then, as described above, from the right end of the cylinder 75 through the port 78, causing movement of the valve 54 to the right thereby uncovering port 69 and allowing this pressure fluid to flow to the return port 71, the snubber valve 72, return line 73 and to the receiver or sump 65.

The suction which is created within the cylinder 75 at the left end of the piston 77 can draw fluid from the sump 65, inasmuch as the movement of the valve 54 connects port 79 at the cylinder through the port 70 to the line 68, which is cut off from the pressure pump 66 by the valve 80 which has been turned by the gust lock control to connect the left part of line 68 to 68a and 73, since 72a is then also shut off. Actually the volume of oil displaced from the right side of the piston 77 through the metering valve 72 into the return line is substantially the same as that which is required to be drawn into the other end of the cylinder by the suction which is created, and the differential in these volumes which passes to or is drawn from the reservoir 65 is relatively small.

The valve 72 may be adjusted to throttle to any desired degree, the reactive pressure flow through the port 69 across the valve 53 and out the return line 71, and accordingly relatively strong gusts are capable of moving the control surface against the resistance imposed by the valve 72. However, such gust movements are slowed down and retarded, and the present arrangement does not require the conventional locking bar or harness at the pilot's control station. However, movements of the rod 50 induce corresponding movements of the walking beam 45 and the pilot's control columns 17, and as described above movements of the levers 45 and 47, under these conditions, do not operate the valve stem 55, since the lack of resistance at the walking beam 45, the parallelogram linkage 56, 58 and 59 is permitted to fulcrum at 57 to transmit gust movements from 47 to 45, whereas resistance or holding of 45 would cause movement of the valve stem 55. The described gust lock feature accordingly protects the control surfaces and the operating system while the airplane is unattended, and the hydraulic pump 66 not operating, by the aforementioned hydraulic snubbing arrangement which is readily and accurately adjustable at the valve 72.

Other advantages and modifications, both as to general arrangement and detail design which may occur to those skilled in the art after a reading of the foregoing description are intended to come within the scope and spirit of the present invention as more clearly defined by the following claims.

We claim:

1. In an aircraft control system including a control surface, dual control levers mounted for independent rotation about the same axis in the region of said control surface, means for transmitting pilot control forces to the first of said levers, means carried by said levers for interengagement one with the other upon overtaking rotation of either of said levers, and means directly interconnecting a second of said levers with said control surface, a booster mechanism for the hydraulic operation of said surface comprising a four-way balanced piston valve forming the control for said hydraulic booster mechanism, an actuating linkage operating about spaced pivots carried by each of said levers disposed upon a radial line extending from said common axis of lever rotation, a link pivotally connected to said piston of said hydraulic control, parallel links pivotally associated with each of said lever pivots and with said first link, the said linkage thereby being adapted to actuate the booster control upon initial movement of said first lever by pilot forces, a hydraulic piston-cylinder motor forming a part of said booster mechanism operable in response to actuation of said booster control, said second lever interconnecting means being entirely independent of the hydraulic portion of said booster mechanism, and separate means directly interconnecting in an operative relationship the said hydraulic motor with said control surface entirely independently of said second lever connection means.

2. A hydraulic booster system for aircraft comprising a control surface, a manually-controlled element provided to initiate operation of said control surface, a source of hydraulic pressure, a valve casing fluidly connected to said pressure source, a piston valve arranged to reciprocate within said valve casing, a servo-cylinder fluidly interconnected with said valve casing, a piston within said servo-cylinder operatively connected to said control surface, means to transmit manual control forces from said manually-controlled element either directly to said control surface or to said piston valve comprising a rotatable lever operatively engaged by said manually-controlled element, means interconnecting said rotatable lever and the said control surface to provide direct manual control thereof, means transmitting the movements of said manually-controlled element and of said lever to the said piston valve, booster by-pass means fluidly interconnected across the connections between said valve casing and the ends of said servo-cylinder adapted to by-pass fluid when predetermined pressures are reached in either end of said servo-cylinder, supply and return conduits leading from said valve casing to the source of pressure, a first gust lock by-pass conduit interconnecting said supply and return conduits, stop valves interposed in the said supply and return conduits operable to direct reactive fluid flow through said gust lock by-pass, a second gust lock by-pass bridging the valve in the return conduit and a metering valve interposed in said second by-pass to impose a restriction to the oscillation of fluid in the return line resulting from gust blows upon said control surface reacting through said booster system.

3. A hydraulic booster system for aircraft comprising a control surface, a manually-controlled element adapted to control the operation of said control surface, a source of hydraulic pressure, a balanced four-way valve comprising a casing fluidly connected to said pressure source, a piston valve arranged to reciprocate within said valve casing, a servo-cylinder fluidly interconnected with said valve casing, a piston within said servo-cylinder operatively connected to said control surface, means to transmit control forces from said manually-controlled element either directly to said control surface or to said piston valve comprising a rotatable lever operatively engaged by said manually-controlled element, means interconnecting the rotatable lever and the said control surface to provide direct manual control thereof, means transmitting the movements of said manually-controlled element and of said lever to said piston valve, booster by-pass means fluidly interconnected across the connections between said valve casing and the ends of said servo-cylinder adapted to by-pass fluid when predetermined pressures are reached in either end of said servo-cylinder, manual means adapted to open said by-pass irrespective of said fluid pressure for converting said hydraulic booster to a mechanical system, supply and return conduits leading from said valve casing to said source of pressure, a first gust lock by-pass conduit interconnecting said supply and return conduits, stop valves interposed in said supply and return conduits operable to direct the reactive fluid flow through said by-pass, a second gust lock by-pass bridging the valve in said return conduit and a metering valve interposed in said second by-pass to impose a restriction to the oscillation of fluid in said return line resulting from movements of the control surface caused by gusts initiating said reactive flow through said booster system.

4. A hydraulic booster system for aircraft comprising a control surface, a manually-controlled element, a source of hydraulic fluid pressure, a balanced four-way valve comprising a casing fluidly connected to said pressure source by a fluid pressure conduit, a piston valve arranged to reciprocate within said valve casing, a servo-cylinder fluidly interconnected with said valve casing, a piston within said servo-cylinder operatively connected to said control surface, means to transmit control forces from said manually-controlled element to said control surface and to said piston valve, storage means for the accumulation of said hydraulic fluid, outlet ports in said valve casing fluidly connected by a return line to said storage means, a branch conduit connecting said return line to said fluid pressure conduit, three-way valve means at the junction of said last two conduits adapted to shut off said pressure source and connect said return line directly with the normal pressure inlet to said valve casing, and adjustable metering means in the said branch conduit adapted to control the rate of oscillation of the reactive fluid flow initiated by gust movements of said control surface as transmitted through the fluid system by the movement in either direction of said piston in said servo-cylinder.

5. In an aircraft control system, a balanced four-way valve comprising a casing, a piston valve arranged to reciprocate within said valve casing, a source of hydraulic fluid under pressure, a conduit from said source to a centrally located port in said valve casing, a servo-cylinder having a movable piston adapted for the operation of a movable aircraft element, fluid conduits connecting the ends of said servo-cylinder with feed ports in said valve casing normally covered by said piston valve in its neutral position, fluid spaces within said valve casing between each end and the end faces of said piston valve adapted to contain an initial supply of hydraulic fluid, fluid conduits interconnecting said spaces with the adjacent conduits to the said ports closed by said piston valve, and means for applying manual control forces to said piston for the hydraulic operation of said movable element, such control forces acting to force an initial supply of hydraulic fluid into the servo-cylinder prior to the uncovering of said feed ports.

6. In an aircraft control system, a balanced four-way hydraulic valve comprising a casing, a piston valve arranged to reciprocate within said valve casing having piston rods extending through the ends of said valve casing, a source of hydraulic fluid under pressure, a conduit from said source to a centrally located port in said valve casing, a servo-cylinder having a movable piston adapted for the operation of a movable aircraft element, fluid conduits connecting the ends of said servo-cylinder with feed ports in said valve casing normally covered by said piston valve in its neutral position, fluid spaces within said valve casing between each end and the end faces of said piston valve, each adapted to contain a quantity of said hydraulic operating fluid, conduits interconnecting said spaces with the adjacent conduits to the said ports normally closed by said piston valve whereby fluid pressures transmitted reversely through the hydraulic system are effective to actuate said piston valve, said piston valve and rod assembly having abutment portions spaced from the ends of said valve casing in said neutral position and resilient means interposed between said abutment portions and said valve casing ends adapted to urge said piston valve into said neutral position.

7. In a power-operated control system for aircraft provided to operate a movable control surface, a hydraulic power mechanism comprising a pilot-operated control instrumentality, a servo-motor operatively connected to said control surface, fluid connections operatively interconnecting said control instrumentality and said servo-motor, supply and return conduits leading from said control instrumentality to a source of hydraulic pressure, said control surface subjected in the grounded condition of the aircraft to other than pilot-operated forces acting upon said control surface inducing fluid flow within said system by movement of said servo-motor, a by-pass conduit interconnecting said supply and return conduits, stop valves interposed in said supply and return conduits operable to direct the said induced fluid flow solely through said by-pass, a second by-pass bridging the valve in the return conduit and a metering valve interposed in said second by-pass adapted to impose a restriction to the oscillation of said induced fluid flow in said return conduit resulting from oscillation of said control surface reacting through said servo-motor.

8. In a control system for an aircraft member, a source of hydraulic pressure, hydraulic power means connected to operate said aircraft member, a control for said power means comprising a combination distributing valve and hydraulic power plant, force transmission means comprising a first lever and a second lever, said first lever being organized to drive said second lever after an initial movement, a linkage connecting said first lever to said control adapted to cause operation of said power means upon initial movement of said first lever, such operation occurring initially by direct displacement of hydraulic operating medium from said control to said hydraulic power means and thereafter by fluid pressure transmitted through said control from said hydraulic pressure source, a second linkage connected between said second lever and the said aircraft member effective to operate said member as a result of movement of said first lever additional to the said initial movement thereof and an operating interconnection between said second lever and said first linkage effective to modify the action of said linkage as a result of movement of said aircraft member reflected through said second linkage.

9. In a power booster system for aircraft including a source of fluid pressure, a control valve, a fluid motor, a control surface operably connected to said fluid motor, and supply and return conduits connecting said pressure source through said control valve to said fluid motor, a gust lock comprising a bypass interconnecting the supply and return conduits between said source and said control valve, a metering valve in the return line disposed between the control valve and said bypass connection and means operable to cut off the pressure source at said bypass and to direct the reaction pressure flow, developed in said fluid motor by gust loads acting on said control surface, through said metering valve.

10. In an aircraft having a control surface, a booster system for the operation of said control surface comprising a multiple hydraulic control valve having a casing, a multiple piston valve arranged to operate within said control valve casing, a source of hydraulic pressure fluid, supply and return conduits from said fluid source to said control valve casing, a hydraulic servo-motor operatively connected to said control surface, fluid conduits in communication between the ends of said servo-motor and outlet ports in said control valve casing normally closed by said multiple piston valve in its neutral position, fluid chambers within said control valve casing between the ends thereof and the ends of said multiple piston valve adapted to contain hydraulic fluid, fluid conduits interconnecting said end chambers with the adjacent conduits to the said valve casing outlet ports closed by said piston valve, and manual means for applying control forces to said multiple piston valve for the hydraulic power operation of said control surface whereby the initial control force in moving said multiple piston valve displaces fluid from the corresponding end chamber for the initial actuation of said servo-motor and the operatively connected control surface such that the reaction to its movement is transmitted through said system and felt by the operator applying said control force.

11. In an aircraft control system including a control surface, a multiple hydraulic control valve having a casing, a multiple piston valve arranged to operatively reciprocate within said valve casing, a source of hydraulic fluid under pressure, a hydraulic servo-motor engaging said control surface, supply and return conduits interconnecting said fluid source with the inlet and return outlet of said control valve casing, fluid conduits connecting said servo-motor with outlet ports in said control valve casing, and means for applying manual control forces to said piston valve for the power operation of said control surface by said hydraulic servo-motor, gust lock means for the protection of said control system from gusts applied to said control surface while the aircraft is parked on the ground and while said source of hydraulic fluid pressure is not operating, said gust lock means including a three-way valve interposed in said supply conduit, a gust lock bypass conduit extending from said three-way valve to said return conduit, a stop valve interposed within said gust lock bypass conduit, metering means interposed within said return conduit between said pressure source and the connection to said gust lock bypass conduit, and a second bypass conduit communicating with said first bypass conduit between said three-way and stop valves and connected to said return conduit between said metering means and said pressure source whereby fluid forces developed within said system by gusts upon said control surface are damped by flowing through said metering means.

12. An aircraft control system of the type set forth in claim 11 characterized by a single control for the simultaneous operation of said gust lock three-way and stop valves to cause said three-way valve to provide communication between said gust lock bypass conduit and the pressure inlet to said control valve casing while closing said stop valve to cause all of the fluid flow induced by gusts upon said control surface flowing through said control valve casing to pass through said metering means.

13. In an aircraft control system including a control surface, dual levers mounted for independent rotation in the region of said control surface remote from the pilot position, means for transmitting pilot control forces to a first of said dual levers, means jointly carried by said dual levers for the interengagement one with the other upon overtaking rotation of either of said dual levers, and means directly connecting the second of said dual levers with said control surface; a booster mechanism for the hydraulic operation of said control surface comprising a four-way balanced piston valve forming the control for said hydraulic booster mechanism, a double-acting hydraulic piston-cylinder motor for the booster operation of said control surface in response to actuation of said piston valve control, an actuating linkage operating about spaced pivots separately carried by each of said dual levers consisting of a first link pivotally connected to the said piston valve of said four-way hydraulic control, parallel links pivotally and separately connected to each of said spaced dual lever pivots and to said first link, the piston of said hydraulic motor pivotally associated with an outer terminal of said second lever and the said direct connection of said second lever with said control surface in such manner that said actuating linkage is adapted to initiate said piston valve and said motor upon initial movement of the first of said dual levers by said pilot control forces.

14. In an aircraft control system including a control surface, dual levers mounted for independent movements in the region of said control surface remote from the pilot control position, means for transmitting control forces to a first of said dual levers, means carried jointly by said dual levers for interengagement one with the other upon overtaking rotation by either of said levers, and means directly connecting the second of said dual levers with said control surface; a booster mechanism for the hydraulic operation of said control surface comprising a four-way balanced piston valve providing the control for said booster mechanism, a double-acting servo-motor having a cylinder and piston, fluid means interconnecting said piston valve control with each end of said servo-motor cylinder for its operation in either direction, actuating linkage operating about spaced pivots carried by each of said dual levers consisting of a first link pivotally connected to said piston valve of said hydraulic control, parallel links pivotally associated with each of said spaced dual lever pivots and with said first link and resilient centering means associated with said piston valve of said hydraulic control effective through said actuating linkage to restore said piston valve, actuating linkage and dual levers to their centralized neutral relationship upon the removal of said pilot forces.

ROBERT RICHOLT.
EARLE S. PEARSALL, Jr.